Sept. 3, 1968 M. G. HARMAN 3,400,379

GENERALIZED LOGIC CIRCUITRY

Filed Jan. 3, 1966 6 Sheets-Sheet 1

INVENTOR
MICHAEL G. HARMAN
BY Louis A. Kline
Glenn W. Bowes
HIS ATTORNEYS

INVENTOR
MICHAEL G. HARMAN
BY Louis A. Kline
Glenn W. Bowes
HIS ATTORNEYS

INVENTOR
MICHAEL G. HARMAN
BY Louis A Kline
Glenn W. Bowen
HIS ATTORNEYS

INVENTOR
MICHAEL G. HARMAN
BY Louis A Kline
Glenn W. Bowen
HIS ATTORNEYS

INVENTOR
MICHAEL G. HARMAN
BY
HIS ATTORNEYS

INVENTOR
MICHAEL G. HARMAN
BY Louis A. Kline
Glenn W. Bowes
HIS ATTORNEYS 3,400,379
GENERALIZED LOGIC CIRCUITRY Michael Godfrey Harman, London, England, assignor to The National Cash Register Company, Dayton, Ohio, a corporation of Maryland Filed Jan. 3, 1966, Ser. No. 518,049
Claims priority, application Great Britain, Jan. 20, 1965, 2,556/65
5 Claims. (Cl. 340—172.5)

ABSTRACT OF THE DISCLOSURE

Rectangular logic circuit matrices for the implementation of logic equations are disclosed. One embodiment consists of alternating rows of AND gates and OR gates which are interconnected according to predetermined rules. Another embodiment consists of a matrix of identical logic elements which may be connected to supply a logical function signal to an adjacent logic element in the same row and the inverse of the logical function signal to an adjacent logic element in the same column according to predetermined rules.

The present invention relates to electronic circuit arrangements for forming any desired one of a wide range of logical functions of a plurality of input variables.

In electronic computing and allied arts, the problem sometimes arises of evaluating a given logical function of a given set of input variables. While it is of course possible to wire up a logical circuit to evaluate the given function, using conventional logic elements arranged on a plugboard, this is inconvenient for a variety of reasons, and it has commonly been the practice to program the desired function. For a single program, this will often be acceptable, in that the relevant part of the program will be reasonably short and the writing of the program will not take too much effort. However, if it is desired to be able to select any one of a range of possible functions, the relevant part of the program may be hundreds of instructions long, involving a substantial programming effort and a substantial computing time, as well as occupying a significant portion of the memory of the computer.

It is the object of the present invention to provide a circuit arrangement which can be easily controlled and rapidly operated to evaluate any desired logical function (within certain limits set by the size of the circuit) of a set of input variables.

Accordingly, the present invention provides an electronic circuit for forming any desired one of a range of logical functions of a plurality of input variables, the circuit including: an assembly of logical elements which are interconnectable in a variety of ways; an input register which contains the input variables and applies them to the assembly; and a function control register which contains a representation of the desired logical function and controls the interconnections of the logical elements in accordance with the representation so that the desired logical function is formed at an output of the assembly.

The invention will be more fully explained, and two embodiments thereof described, with reference to the accompanying drawings, in which.

Consider the problem of finding the value of the logical function $$T=a\cdot b\cdot(c\cdot d\cdot e+f)$$

where $a$ to $f$ are signal variables. Assume that a rectangular matrix with rows RI to RIII and columns A to F has a logical unit 10 placed at each position in the matrix (FIGURE 1), the units 10 in rows RI and RIII being AND gates and the units 10 in row RII being OR gates. Assume further that each of the units 10 (other than those in the bottom row RIII and righthand column F) can be connected either to the unit on its right or the unit below it; then with the variables $a$ to $f$ applied along the top of the matrix and with interconnections as shown, it is seen that the above function T is formed.

Figures 1, 2:
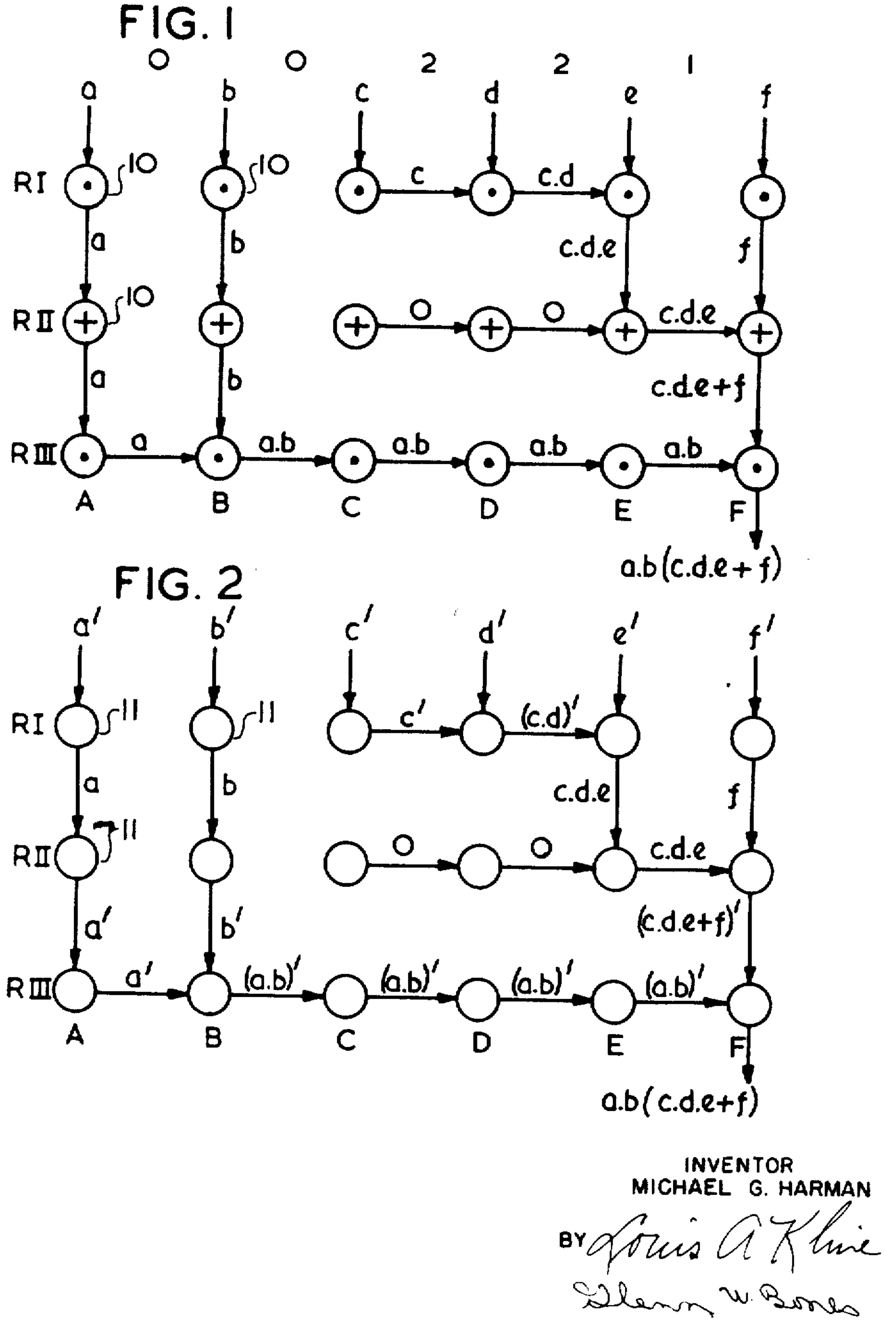
FIGURES 1 and 2 show two matrices of logical units arranged for forming an exemplary function.

The relationship between the form of the function, written in normal Boolean notation, and the corresponding connections in FIGURE 1 may be determined by the following steps. First, the function is written with brackets placed around any product which is to form part of a sum, thus:

$$T=a\cdot b\cdot((c\cdot d\cdot e)+f)$$

Second, beneath each operation sign (sum or product), the number of brackets in which it is enclosed is written, thus:

$$T=a\underset{0}{\cdot}b\underset{0}{\cdot}((c\underset{2}{\cdot}d\underset{2}{\cdot}e)\underset{1}{+}f)$$

Third, each pair of adjacent columns of units 10 in FIGURE 1 is taken in turn, and $n+1$ horizontal connections are made between the units 10 of the two columns, starting at the bottom of the columns, where $n$ is the number of brackets enclosing the operation sign between the two variables correpsonding to the two columns. (For example, for the pair of columns E and F of the matrix, $n=1$, so the lowermost two pairs of units 10 of this pair of columns are connected together). Fourth, a vertical connection is made downwards from each unit 10 in FIGURE 1 without a horizontal output. Every unit 10 thus has one output, either vertically downwards or horizontally to the right. There is thus a simple connection between the Boolean form of the function with full brackets and the corresponding connections in the matrix of FIGURE 1.

It will be noted that there is one unit 10 in FIGURE 1, at the intersection of row RII and column C, which has no input; in general, there may be several such units. Such units with no inputs must be arranged to produce outputs of "1" if they are AND units, and "0" if they are OR units.

A substantial simplification of "hardware," i.e. circuit design and construction, problems is made if the logical units are modified so that the same logical unit is used throughout the matrix. This can be achieved most easily by introducing an inversion in the vertical connections of FIGURE 1. All the logical units now become identical, forming, say, the sum of the inputs on the horizontal output and the inverse of this sum on the vertical output. (The product, instead of the sum, could equally well be used). One result of this is that all units with no inputs must produce the same output—"0" in the case considered.

FIGURE 2 shows the arrangement of FIGURE 1, modified by using units 11 which produce the logical sum of the inputs on the horizontal output and the inverse of this on the vertical output. It will be noted that the connections between the units 11 are exactly the same as between the corresponding units 10 in FIGURE 1 for forming the same function, and that the signals appearing at various points in the network of FIGURE 2 are either the same as at the corresponding points of FIGURE 1 or the inverse of those in FIGURE 1, depending on which row the signal appear in. Since an odd number of rows of units are shown, the total number of inversions undergone by a signal in passing from an input at the top to the final output at the bottom is odd; the inputs at the top of FIGURE 2 must therefore be inverted relative to the corresponding inputs in FIGURE 1.

It will be realized that both unchanged and inverted terms will often appear in arbitrary logical functions. Accordingly, a controlled inverter is preferably provided for each column of the matrix, so that the input signals may be inverted if necessary. It is also advantageous to provide a controlled inverter at the output from the matrix, so that the output may be inverted if desired, this will permit, in a three-row matrix, functions of both the OR-AND-OR and the AND-OR-AND type to be evaluated.

Figure 3:
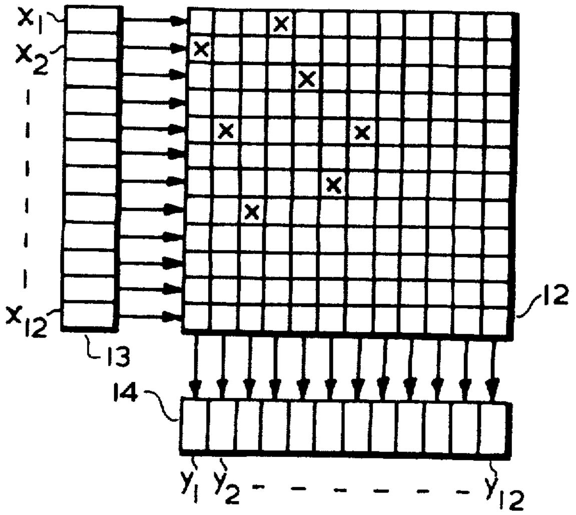
FIGURE 3 shows schematically a permutation matrix.

A most serious restriction on the arrangements discussed so far is that the input variables must be available in the order in which they appear in the function which it is desired to evaluate. This limitation can be overcome by providing means for permuting the input variables. Such means may conveniently be in the form of a matrix of bistable storage elements, preferably of the non-destructive read-out type. FIGURE 3 shows schematically such a permutation matrix 12 for permuting the twelve bits $x_1$ to $x_{12}$ of an input word contained in register 13 into any desired order in the output word $y_1$ to $y_{12}$, which will appear in register 14. The matrix 12 comprises 144 non-destructive read-out elements, e.g. transfluxors, arranged in a square array. With the elements marked "X" set and all other elements cleared, the output word will be $x_2$, $x_5$, $x_8$, $x_1$, $x_3$, $x_7$, $x_5$, 0, 0, 0, 0, 0. As may be seen from the example just described, a particular bit of the input word may occur more than once in the output word, and other bits in the input word may not appear at all in the output word. The initial setting up of such a permutation matrix will normally be substantially serial (column by column) or series-parallel (by groups of columns); the subsequent permuting of the bits of each input word will normally be in parallel.

Figure 4:
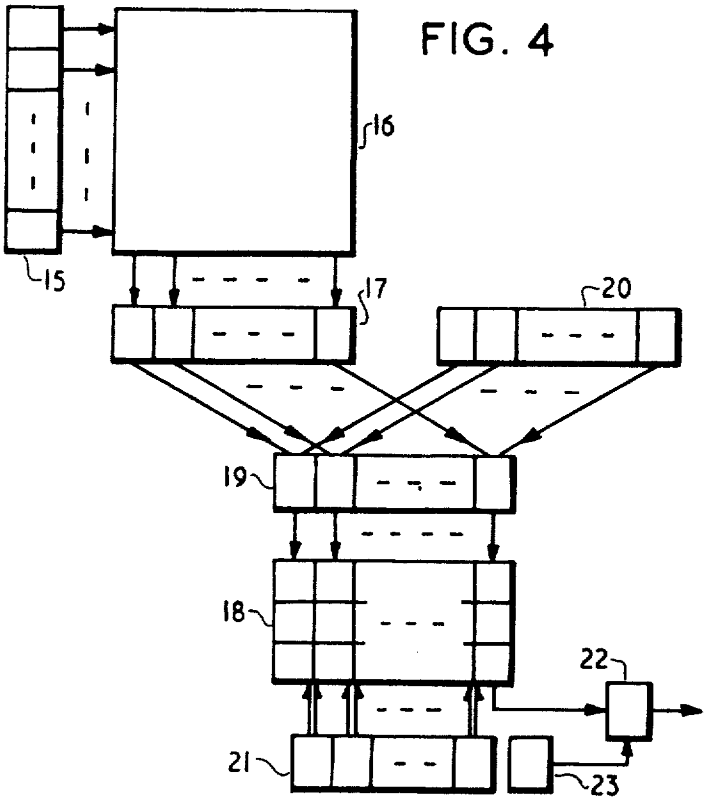
FIGURE 4 is a block schematic diagram of the first embodiment of the invention.

With the above outline in mind, the general arrangement of a complete apparatus for evaluating logical functions will now be discussed. Referring to FIGURE 4, an input register 15 feeds a permutation matrix 16 the output of which is applied to an intermediate register 17. The intermediate register 17 feeds a logic matrix 18 via a set of controlled input inverters 19 which are controlled from an input inversion control register 20. The internal connections in the logic matrix 18 are controlled from a matrix control register 21, and the output from the logic matrix is passed through a controlled output inverter 22 controlled by an output inversion control flip-flop 23.

The number of flip-flops in each of the registers 17 and 20 will of course be equal to $p$, where $p$ is the number of columns in the logic matrix 18, and the number of controlled inverters 19 is also $p$. The number of flip-flops in the register 15, however, need not be equal to $p$, and in some circumstances may conveniently be, say $2p$. The register 21 must be capable of producing any one of $q$ different outputs for each of the $(p-1)$ pairs of adjacent columns of the logic matrix 18, where $q$ is the number of rows in the logic matrix 18. With the simplest construction, the register 21 will consist of $(p-1)$ sections each of which contains enough flip-flops to store the required number, $q$, of states. The number of flip-flops in the register 21 will therefore be an exact multiple of $(p-1)$, so that if the register 21 is set up by words of length $p$ bits, one of the words will have a few unused bits. One of these bits may conveniently be used to indicate the state that the output inversion control flip-flop 23 has to be set to, and this flip-flop 23 may be regarded as forming a part of the register 21.

It is thus evident that any desired logical function can be evaluated by the apparatus, provided that (j) the total number of terms appearing in the Boolean expression for the function is not greater than the number of columns in the logic matrix, and (jj) the logical depth of the expression is not greater than the number of rows in the logic matrix.

The logical depth of an expression is equal to the greatest of the numbers $n+1$ referred to previously.

A suitable form of circuitry for the logic matrix 18 will now be described. The convention adopted here for the input signals to the logic matrix 18, and for the functions of these signals appearing in the logic matrix 18, is $$TRUE = \text{"1"} = +4 \text{ v.}$$

$$FALSE = \text{"0"} = 0 \text{ v.}$$

Figure 5:
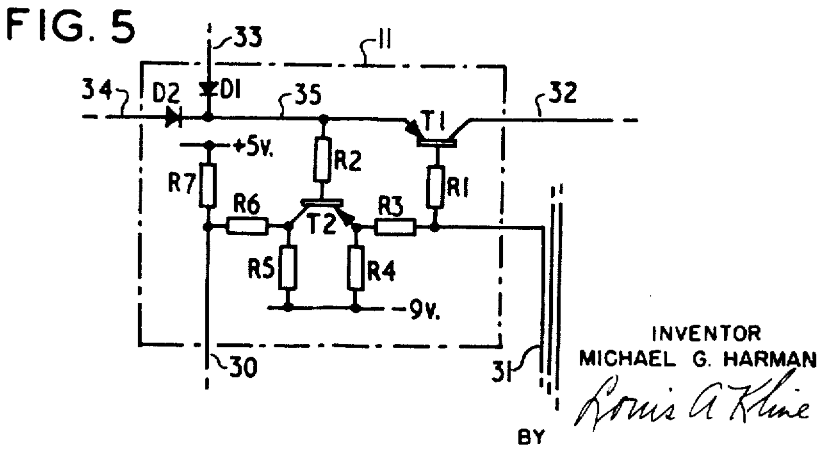
FIGURE 5 is a circuit diagram of a logical unit of the embodiment of FIGURE 4.

Consider first a logical unit 11 (FIGURE 5). This unit is controlled by a control signal on line 31, and is constructed to be effectively connected to the next unit to the right or the next unit below it according as the control signal is false or true. Each section of the matrix $$TRUE = +6 \text{ v.}$$

control register 21 (FIGURE 4) has $q$ output lines ($q$ being the number of rows in the logic matrix 18), forming the control lines to the logical units of the column to its left, of which those fed to the first $q-n-1$ rows (starting at the uppermost row) are true, and the rest are false. The voltage levels on these control lines are as follows:

$$FALSE = +1 \text{ v.}$$

The vertical and horizontal input lines 33 and 34 to the unit 11 (FIGURE 5) are connected to a common line 35 via two respective diodes D1 and D2 which form an OR gate, so that the logical sum of the signals on the vertical and horizontal input lines 33 and 34 is formed on line 35. This logical sum on line 35 is applied to the emitter of a transistor T1, to the base of which the control signal on line 31 is applied via a resistor R1 and to the collector of which the horizontal output line 32 is connected. Thus if the control signal is true, i.e., at +6 v., transistor T1 is cut off (since its emitter must be negative relative to its base). If the control signal is false, however, transistor T1 will still be cut off if the voltage at its emitter is 0 v., but will be cut on and saturated if the voltage at its emitter is +4 v. In this last case, the collector voltage will be approximately equal to the emitter voltage. Thus a horizontal output signal representing the logical sum of the input signals is produced by the unit 11 if the control signal is false.

The logical sum on line 35 is also fed to a second transistor T2 via base resistor R2. The control signal on line 31 is applied to the emitter of this transistor T2 via a voltage level shifting network which consists of two resistors R3 and R4 connected in series between the line 31 and a −9 v. bias source, as shown their resistance being R and 4R respectively. The true and false control signal levels at the emitter of transistor T2 are therefore +3 v. and −1 v. respectively. Three resistors R5, R6, and R7, with resistances 4R′, 5R′, and 5R′ respectively, are connected in series between the −9 v. bias source and a +5 v. bias source, R′ being much greater than R, and the collector of transistor T2 is connected to the junction of resistors R5 and R6. If transistor T2 is cut on, as a result of the control signal being true and the logical sum of the input signals being false, its collector will be at +3 v. (the voltage at its emitter); if it is cut off, its collector will be at −5 v. The voltage of +3 v. or −5 v. at the collector of transistor T2 will result in a corresponding voltage of +4 v. or 0 v. respectively (i.e., the proper voltages for the logical signals "1" and "0" appearing on the vertical output line 30, which is connected to the junction of resistors R6 and R7.

It will be realized that if transistor T1 has appropriate characteristics, the diode D2 can be omitted.

Figure 5A:
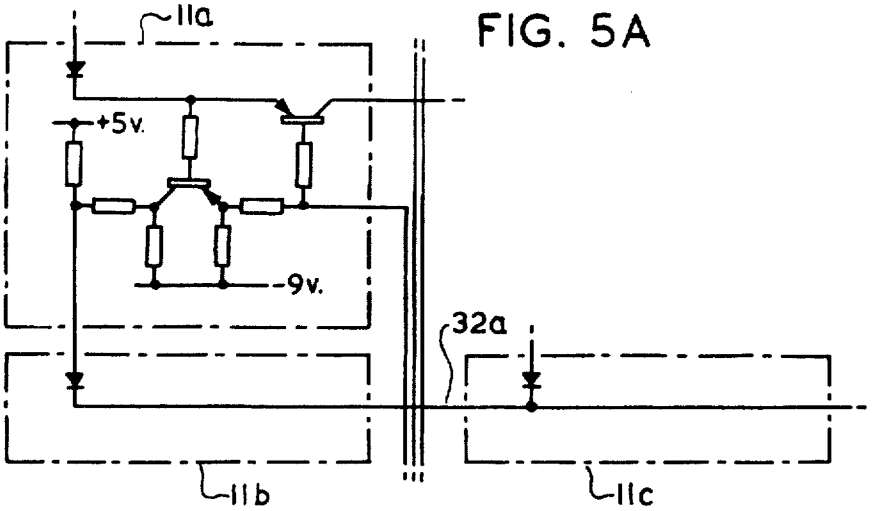
FIGURES 5A and 5B show modified forms of the circuit of FIG. 5.
Figure 5B:
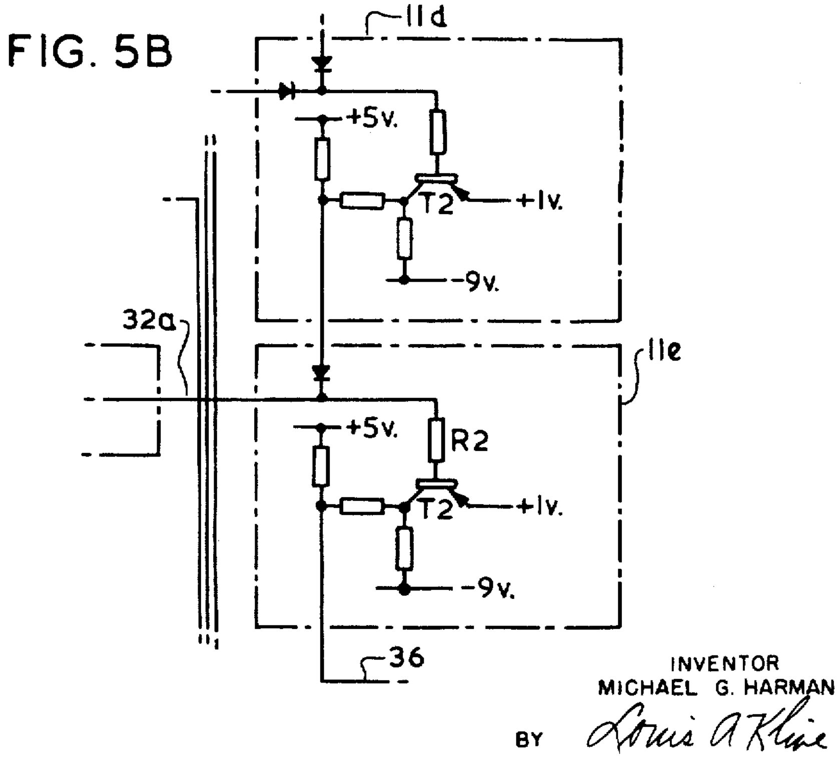

The logical unit 11 shown in FIG. 5 is suitable for use in the "interior" of the logic matrix 18. For logical units on the left-hand, right-hand, and bottom edges of the logic matrix 18, modifications are needed. With reference to FIG. 5A, the form of a logical unit on the left-hand edge is shown at 11*a*. It will be noted that the only modification here is the absence of a horizontal input line and its respective diode. Also shown in FIG. 5A is the form of logical units 11*b* and 11*c* which lie at the left-hand bottom corner and on the bottom edge, respectively, of the logic matrix 18. These units are greatly modified relative to the unit of FIG. 5, and consist merely of a single diode apiece, connecting the vertical inputs to the line 32*a*, the diodes acting together as an OR gate. With reference to FIG. 5B, the forms of a logical unit 11*d* on the right-hand edge and the logical unit 11*e* at the right-hand bottom corner of the logic matrix 18 are shown. These units have been modified by the omission of the transistor T1 and associated circuitry, and the provision of a fixed +1 v. supply voltage for the emitter of the transistor T2. Also, the horizontal input line 32*a* which feeds the logical unit 11*e* is directly connected to the resistor R2 of that unit. The output line 36 from the logical unit 11*e* is the output line of the logic matrix 18.

It will be realized that a certain attenuation of the signals will occur if several adjacent logical units in a row all provide horizontal outputs. To overcome this, sets of amplifiers can be inserted between pairs of columns at suitable intervals if necessary.

The above-described arrangement is fully parallel, i.e., the bits of the word in the input register 15 (FIGURE 4) are all rearranged simultaneously by the permutation matrix 16, and the rearranged bits, which appear in the intermediate register 17, are all applied simultaneously to the logic matrix 18. It will be realized, however, that it may be desirable or necessary to use a serial technique for the logic matrix (e.g. when magnetic core or parametron circuitry is being used). A simple serial system using flip-flops will therefore now be described.

Figure 6:
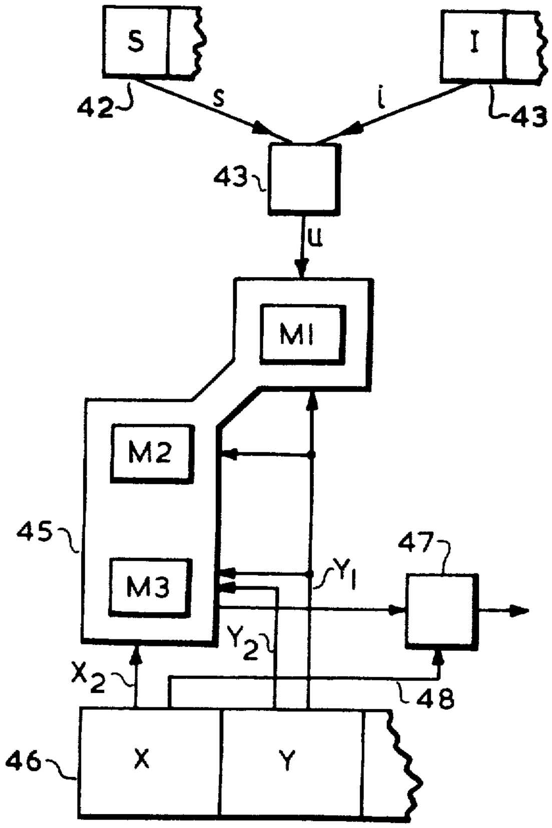
FIGURE 6 is a block schematic diagram of the second embodiment of the invention.

Referring to FIGURE 6, the intermediate register 17 and the input inversion control register 20 of the arrangement of FIGURE 4 are replaced by corresponding shift registers 42 and 44. Only the left-hand ends of these shift registers are shown, the end stages being S and I respectively. The outputs *s* and *i* from these two end stages S and I are fed to a controlled inverter 43 (corresponding to the set of controlled inverters 19 of FIGURE 4), so that the bits of the word in the intermediate shift register 42 appear serially, at the output *u* of the controlled inverter 43, either unchanged or inverted depending on the corresponding bit in the input inversion control shift register 44. The output *u* from the controlled inverter 43 is applied to a logic array 45, to which the outputs of the final two stages of a logic array control shift register 46 (which corresponds to the logic matrix control register 21 of FIGURE 4) are applied. Only the two left-hand end stages X and Y of the shift register 46 are shown. The output from the logic array 45 is applied to a controlled output inverter 47 (corresponding to the controlled output inverter 22 of FIGURE 4), which is controlled from the logic array control shift register 46.

The logic array 45 corresponds to the logic matrix of FIGURE 2, and comprises three flip-flops M1 to M3 which respectively correspond, at any instant, to a logical unit in row RI and two logical units in rows RII and RIII of the column immediately to the left of the column containing the first unit.

Figure 7:
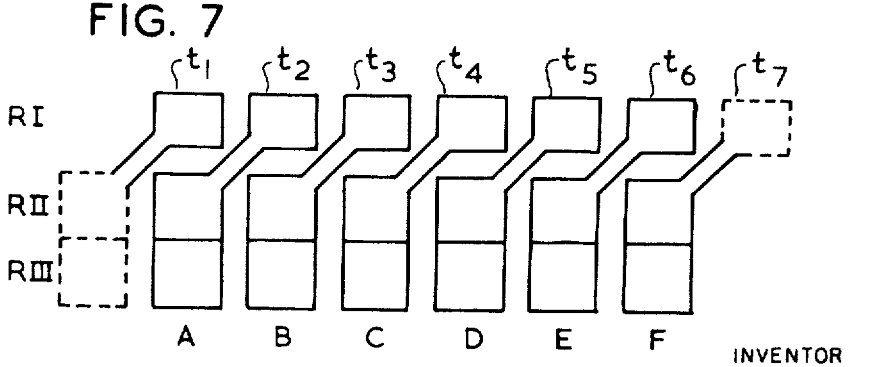

The timing signals and conventions will first be described. It is assumed that the input word is six bits long. A total of eight equal time intervals, to clock periods and referenced *t*0 to *t*7, are required to form the desired logical function of the input bits (which are initially in register 42). Two of these clock periods, *t*0 and *t*7, are directly defined by timing signals *t*0 and *t*7 which are true during the respective clock periods and false at all other times. All clock periods are effectively defined by a clock signal K, which is false for the first half and true for the second half of each clock period. The flip-flops used in the circuitry are all constructed with inputs which include the clock signal K as a logical multiplier, and are arranged to change state in response to the clock signal K going false, i.e. at the end of a clock period. The six bits of the input word from register 42 appear successively as the signal *s* during the clock periods *t*0 to *t*6, and the registers 44 and 46 are, of course, synchronized with the register 42. It will be realized from FIG. 7, of course, that the information in the shift registers 42, 44, and 46 of FIG. 6 is a stored the "same way round" as the information in the registers 17, 20 and 21 of FIG. 4; so that the information corresponding to that stored in the left-hand ends of the registers 17, 20 and 21 appears first at the left-hand ends of the shift registers 42, 44 and 46 respectively, these three shift registers all shifting the information in them to the left. It will be realized that the array 45 of FIG. 6 represents, in effect, a section through the logic matrix of FIGURE 2, this section moving one logical unit to the right for each clock period. If the logic array 45 is drawn seven times, once for each of the clock periods *t*1 to *t*7, as shown in FIGURE 7, and the states of the units 11 of FIGURE 2 are defined as the stated of their horizontal outputs, then the pattern formed by the successive states of the flip-flop M1 to M3 in FIGURE 7 (ignoring the states of flip-flops M2 and M3 in clock period *t*1 and of flip-flop M1 in clock period *t*7) is isomorphic with the pattern of states of the units 11 of FIGURE 2, for the same input word and desired function.

To understand the logical equations for the inputs to the flip-flops M1 to M3, the advance from one clock period to the next, say from clock period *t*2 to clock period *t*3, must be considered more closely. The convention used here for flip-flops is that, say, flip-flop M1 has two inputs $m_1$ and $_0m_1$, and is set true and false, respectively, by (true) signals on these two respective inputs, and has two outputs $M_1$ and $M_1'$, output $M_1$ having the same state as the flip-flop and output $M_1'$ being the inverse of output $M_1$. The relevant parts of FIGURE 7 are shown in more detail in FIGURE 8, with interconnecting lines indicating the signals used for setting the flip-flops. Signals $X_2'$, $Y_1$, $Y_1'$ and $Y_2$ are control signals derived from the logic array control shift register 46. Signal $X_2'$ controls the output from flip-flop M2, the horizontal output being true (provided, that of course, flip-flop M2 is true). Signal $Y_1$ controls the output from flip-flop M1, the horizontal output being true if signal $Y_1'$ is true (signal $Y_1$ false) and flip-flop $M_1$ is true, and the vertical output being true if signal $Y_1$ is true and flip-flop M1 is false (because the vertical outputs are the inverse of the horizontal outputs). Signal $Y_2$ controls the output which flip-flop M2 will produce during the next approaching clock period, the vertical output corresponding to the approaching state of flip-flop M2 being true if $Y_2$ is true and flip-flop M2 is about to go false.

Figure 8:
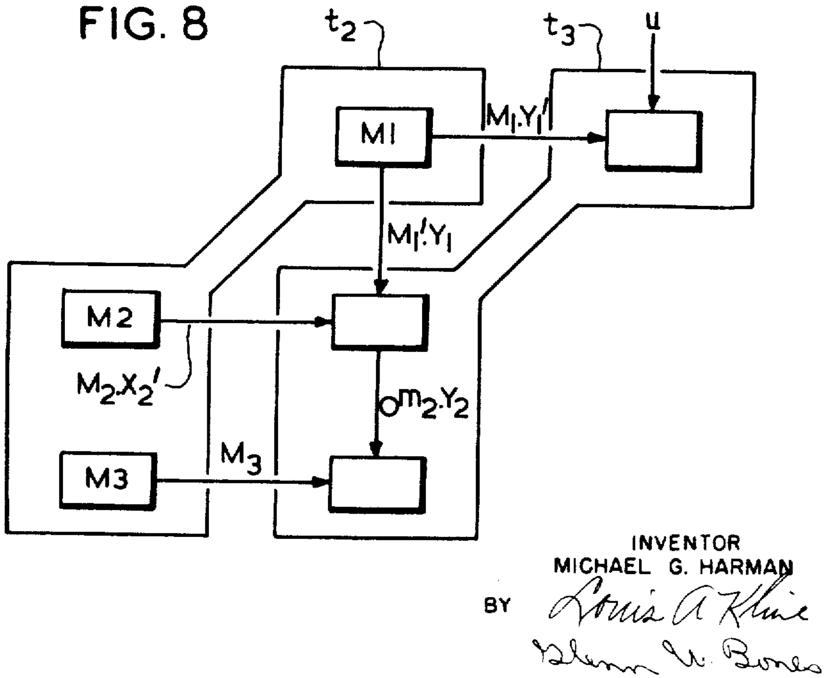
FIGURES 7 and 8 are derived from FIGURE 6 and are used in explaining the operation of the second embodiment.
Figure 9:
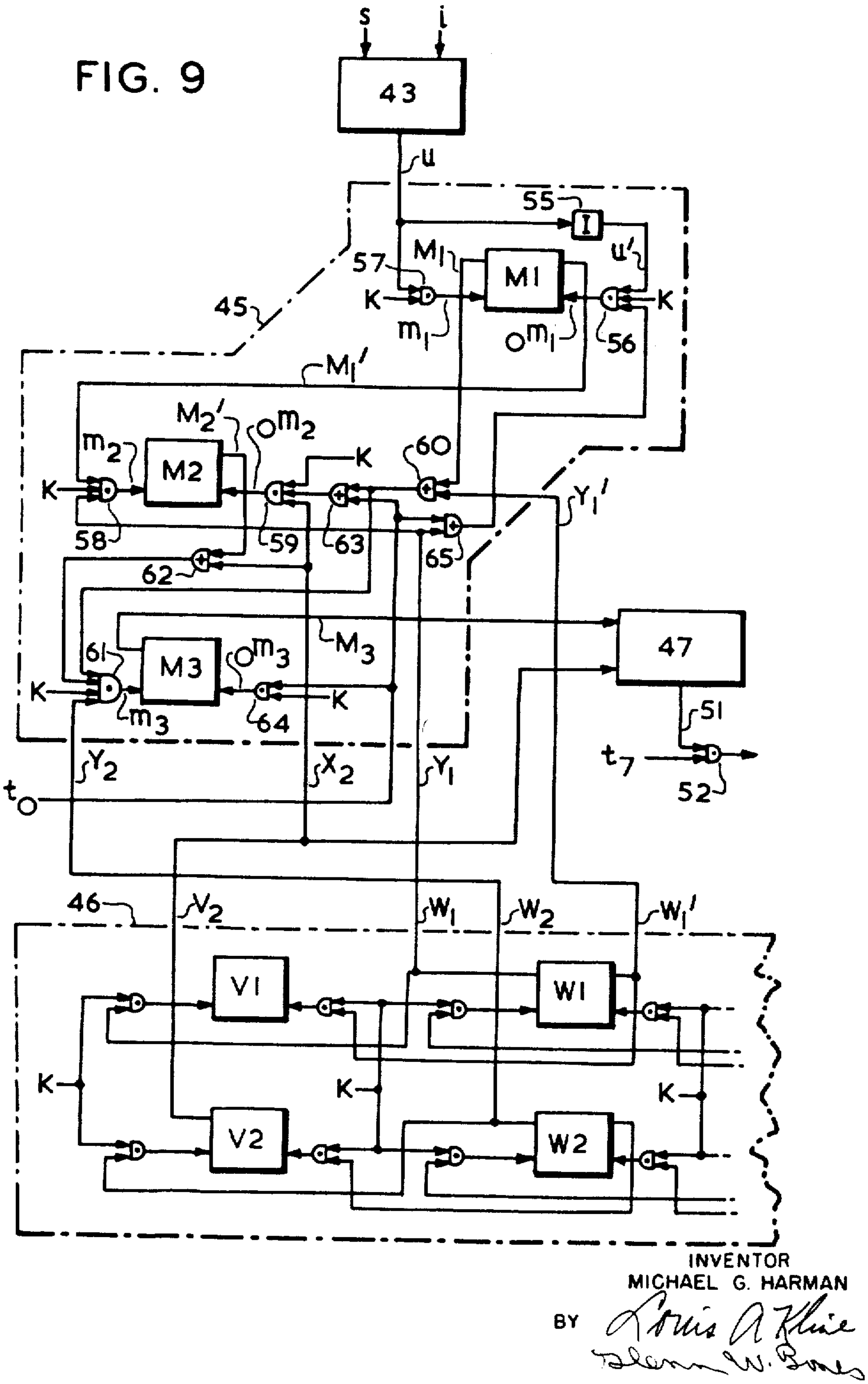
FIGURE 9 is a block circuit diagram of most of the embodiment shown in FIGURE 6.

The circuitry of the logic array 45 will now be described with reference to FIGS. 8 and 9. In FIG. 9, the logical circuitry required to form the logical functions described above for the flip-flops M1 to M3 is shown in detail. In all flip-flops, the inputs are at the lower corners (with reference to FIGURE 9) and the outputs at the upper corners; the true input and true output of each flip-flop are on the left (the true output being true when the flip-flop is true, and a signal on the true input setting the flip-flop true), and the false output and the false input of each flip-flop are on the right (the false output being true when the flip-flop is false, and a signal on the false input setting the flip-flop false).

Considering first the signal *u*, this is obtained from the signals $s$ and $i$ (FIGURE 6) according to the following equation:

$$u=s.i'+s'.i$$

which means that the controlled inverter 43 is an exclusive-OR circuit.

Consider next the state to which the flip-flop M1 must be set for clock period $t$3. If a horizontal connection is to be made from the flip-flop M1 in the preceding clock period $t$2 (signal $Y_1'$ true), then flip-flop M1 must be set true for clock period $t$3 if it was true in clock period $t$2 or if the input signal $u$ is true. If, however, a vertical connection is made from flip-flop M1 in clock period $t$2, then flip-flop M1 is only set true in clock period $t$3 if the input signal $u$ is true. The function $$M_1.Y_1'+u$$

is therefore obtained for the true input $m_1$ of the flip-flop M1. Considering now the false input, the inverse of the above function is obviously required, since if the flip-flop M1 is not set true it must be set false.

Before the final equations for the inputs to flip-flop M1 are obtained, however, two further points must be noted. Firstly, an overall logical product with a clock signal K is obviously required to ensure proper timing, the clock signal K and the flip-flops being such that the states of the flip-flops can change at the end of each clock period. Secondly, since a characteristic property of a flip-flop is that it remains in whatever state it is in until set otherwise, some terms in the functions obtained above will be redundant; thus, for example, the term $M_1.Y_1'$ will only be true if $M_1$ is true, i.e. if the flip-flop is already true, in which case no signal is required to keep the flip-flop true. With these points noted, the equations for the flip-flops M1 become $$m_1=u.K$$

$$_0m_1=u'.Y_1.K$$

These equations are mechanized in FIG. 9 by means of the inverter 55 and the AND gates 56 and 57.

Considering next flip-flop M2, a listing of the various conditions under which it must be set true for clock period $t$3 yields the function $$M_2.X_2'+M_1'.Y_1$$

for its true input, and the inverse of this for its false input. The modification of these functions, in accordance with the above two points, yields the equations $$m_2=M_1'.Y._1K$$

$$_0m_2=X_2(M_1+Y_1')K$$

These equations are mechanized in FIG. 9 by means of the AND gates 58 and 59 and the OR gate 60.

Considering next flip-flop M3, the same procedure must be followed. Here, however, if a vertical connection is to be made to flip-flop M3 for setting it for clock period $t$3, the signal on this vertical connection is the inverse of the state to which flip-flop M2 is about to be, but has not yet been, set. Accordingly the false input to flip-flop M2 must appear also in the equation for the true input of the flip-flop M3, and clearly no simplification in accordance with the second point above may be performed on the false input to flip-flop M2 when used for this purpose. The true input for flip-flop M3 therefore contains the term $$(M_2.X_2'+M_1'.Y_1)'.Y_2+M_3$$

where the primed and bracketed term is the unmodified term for the false input to flip-flop M2. After modification, the equations for the inputs to flip-flop M3 are derived:

$$m_3=(M_2'+X_2)(M_1+Y_1').Y_2.K$$

$$_0m_3=0$$

These equations are mechanized in FIG. 9, by means of the AND gate 61 and the OR gate 62.

Considering now the initial setting of the circuitry, it is clear that flip-flops M2 and M3 must be set false for clock period $t$1, so that any information left in them from a previous operation does not interfere with the current operation. This is achieved by applying the logical product of the timing signal $t_0$ and the clock signal K to their false inputs. The OR gate 63 and the AND gate 64 provide the most convenient way of doing this, as shown in FIG. 9. Flip-flop M1 must also be cleared initially, but it must be allowed to enter the true state during clock period $t$1 if the input signal $u$ is true during clock period $t$0. This is achieved by providing an OR gate 65, FIG. 9, which forms the logical sum $Y_1+t_0$, this sum being applied to AND gate 56 together with the signals $u'$ and K. The complete equation for the false input to flip-flop M1 is therefore $$_0m_1=(Y_1+t_0).u'.K$$

In other words, flip-flop M1 is set, during clock period $t$1, to the state which signal $u$ had during clock period $t$0.

With reference now to FIGURES 6 and 9, the control signal will be described in more detail. In FIGURE 9, the end two stages X and Y of the shift register 46 consist of the two pairs of flip-flops V1 and V2, and W1 and W2 respectively. The states of V1 and V2 together represent in coded form the number $n+1$ for the appropriate pair of columns (e.g. columns A and B for the clock period $t$2), and flip-flops W1 and W2 represent the number $n+1$ for the preceding pair of columns (B and C for the clock period $t$2), in coded form. The following table shows the code used:

| $n+1$ | V1 | V2 | $X_2$ | W1 | W2 | $Y_1$ | $Y_2$ |
|---|---|---|---|---|---|---|---|
| 1 | 0 | 0 | 0 | 0 | 0 | 0 | 0 |
| 2 | 0 | 1 | 1 | 0 | 1 | 0 | 1 |
| 3 | 1 | 1 | 1 | 1 | 1 | 1 | 1 |

It will be noted that $Y_2$ is true if $Y_1$ is true, and it will also be realized that, due to the fact that the contents of the flip-flops W1 and W2 shift into flip-flops V1 and V2 respectively with each clock pulse, the signal $X_2$ is, in any clock period, identical to the signal $Y_2$ in the preceding clock period.

It will be recalled that it was stated that the bit which controlled the controlled output inverter 22 (FIGURE 4) could conveniently be contained in the logic matrix control register 21. The same situation obtains in the case of the serial arrangement of FIGURE 6, and in FIGURE 9 the flip-flop V2 contains this bit during the final clock period $t$7. The true output $V_2$ therefrom is therefore applied to the output inverter 47, together with the true output $M_3$ of the flip-flop M3. The function $M_3.V_2+M_3'.V_2'$ appears on the output line 51 therefrom, and this line is applied to an AND gate 52 together with the timing signal $t$7. The output from the AND gate 52 during the clock period $t$7 is, therefore, the desired logical function of the input variables contained in the shift register 42 (FIG. 6).

The logic array 45 of FIG. 6 represent, in effect, a sloping section of the logic matrix of FIG. 2. It will be realized that this "slope" results in one extra clock period being required to form the desired logical function, compared with the number of clock periods that would be required if the section were "vertical" (i.e. corresponding to a single column) of the logic matrix of FIG. 2. Also, more outputs are required from the logic array control shift register 45 (FIG. 6) when a logic array corresponding to a sloping section of the logic matrix of FIG. 2 is used. On the other hand, the logical equations for the inputs to the flip-flops of the logic array will be more complicated, i.e. have a greater logical depth, if the logic array is a vertical section of the logic matrix of FIG. 2.

It will be noted that the permutation matrix is capable of use for purposes other than in conjunction with the logic matrix or array; for example, it may be used to rearrange different sections of a word or to mask out certain bits. If, as is convenient, magnetic elements are used for the permutation matrix, a three-dimensional structure consisting of several planes of the form shown at 12 in FIG. 3, may be desirable. In such a three-dimensional structure, a number of different permutations may be stored more or less permanently in different planes, all planes except a desired one being inhibited from operation when the permutation matrix is in use.

It will also be realized that the logic matrix or array is suceptible of various modifications. For example, the logical functions which the logical units form may be different; and the form of the matrix may be different, e.g. triangular. It should also be noted that if all horizontal outputs in the top row (RI) of the logic matrix are omitted, any desired bits in the intermediate register can be masked out under the control of the logic matrix control register.

What we claim is:

1. A rectangular logic circuit matrix for the implementation of logic equations comprising a plurality of single output logic elements, the logic elements of the first row of the matrix having signals which represent the terms of the logic equation that is implemented applied thereto from the first column of the matrix to the last column of the matrix in accordance with their order of apparatus in the logic equation, the logic elements of the matrix being interconnected to achieve unidirectional row and unidirectional column implementation flow between adjacent logic elements towards an output logic element which is located in the last row and the last column of the matrix, the output logic element producing the implemented logic equation signal.

2. A rectangular logic circuit matrix for the implementation of logic equations comprising alternating rows of single output AND gates and single output OR gates, the gates of the first row of the matrix having signals which represent the terms of the logic equation that is implemented applied thereto from the first column of the matrix to the last column of the matrix in accordance with their order of appearance in the logic equation, the gates of the matrix being interconnected to achieve unidirectional row and unidirectional column implementation flow between adjacent gates towards an output gate which is located in the last row and the last column of the matrix, the output gate producing the implemented logic equation signal.

3. A rectangular logic circuit matrix for the implementation of logic equations comprising a plurality of identical single output logic elements that are capable of supplying a logical function signal to an adjacent logical element in the same row and the inverse of the logical function signal to an adjacent logical element in the same column, the logic elements of the first row of the matrix having signals which represent the terms of the logic equation that is implemented applied thereto from the first column of the matrix to the last column of the matrix in accordance with their order of appearance in the logic equation, the logic elements of the matrix being interconnected to achieve unidirectional row and unidirectional column implementation flow between adjacent logic elements towards an output logic element which is located in the last row and the last column of the matrix, the output logic element producing the implemented logic equation signal.

4. A rectangular logic circuit matrix for the implementation of logic equations, comprising alternating rows of single output AND gates and single output OR gates which are constructed and connected so as to supply logical function signals only to adjacent gates; the gates being arranged and interconnected so that:

(a) the columns of the matrix are equal in number to the number of individual terms which are found in the logic equation that is implemented, and (b) the rows of the matrix are equal in number to the maximum number of brackets which enclose any of the operation signs of the logic equation that is implemented plus one, and (c) the first row of the matrix consists of gates which correspond in function to the first logical operation of the logic equation that is implemented, the gates of the first row having signals which represent the terms of the logic equation that is implemented applied thereto from the first column of the matrix to the last column of the matrix in accordance with the order of their appearance in the logic equation, and (d) the gate in the last row and the last column being the gate which produces the implemented logic equation signal, implementation flow in the matrix being unidirectional from the first column toward the last column and unidirectional from the first row towards the last row, and (e) $(n+1)$ connections are made between gats in each pair of adjacent columns of the matrix, where $n$ is the number of brackets that surround the operational sign which links the corresponding terms of the logic equation, each set of $(n+1)$ connections between pairs of gates in the appropriate columns beginning with the last row of the matrix and progressing towards the first row of the matrix, and (f) gates which do not have an output connection to any gate in another column have an output connection to the gate which is in the same column and which is in the row that is next closest to the las row of the matrix.

5. A rectangular logic circuit matrix for the implementation of logic equations, comprising a plurality of identical single output logic elements which are constructed and connected so as to supply logical function signals only to adjacent logic elements that are in the same row and the inverse of the logical function signal only to adjacent logic elements that are in the same column; the logic elements being arranged and interconnected so that:

(a) the columns of the matrix are equal in number to the number of individual terms which are found in the logic equation that is implemented, and (b) the rows of the matrix are equal in number to the maximum number of brackets which enclose any of the operation signs of the logic equation that is implemented plus one, and (c) the first row of the matrix consists of logic elements which correspond in function to the first logical operation of the logic equation that is implemented, the gates of the first row having signals which represent the terms of the logic equation that is implemented applied thereto from the first column of the matrix to the last column of the matrix in accordance with the order of their appearance in the logic equation, and (d) the logic element in the last row and the last column being the logic element which produces the implemented logic equation signal, implementation flow in the matrix being unidirectional from the first column towards the last column and unidirectional from the first row towards the last row, and (e) $(n+1)$ connections are made betwen logic elements in each pair of adjacent columns of the matrix, where $n$ is the number of brackets that surround the operation sign which links the corresponding terms of the logic equation, the $(n+1)$ connections between pairs of logic elements in the appropriate columns beginning with the last row of the matrix and progressing towards the first row of the matrix, and (f) logic elements which do not have an output connection to any logic element in another column have an output connection to the logic element which is in the same column and which is in the row that is next closest to the last row of the matrix.

References Cited

UNITED STATES PATENTS 3,312,943 4/1967 McKindles et al. ___ 340—172.5

(Other references on following page)

UNITED STATES PATENTS

| | | | |
|---|---|---|---|
| 3,305,841 | 2/1967 | Schwartz | 340—172.5 |
| 3,300,764 | 1/1967 | Doelz et al. | 340—172.5 |
| 3,287,703 | 11/1966 | Slotnick | 340—172.5 |
| 3,287,702 | 11/1966 | Borck et al. | 340—172.5 |
| 3,274,556 | 9/1966 | Paul et al. | 340—172.5 |
| 3,273,126 | 9/1966 | Owen et al. | 340—172.5 |
| 3,264,457 | 8/1966 | Seegmiller et al. | 235—150.53 |
| 3,212,064 | 10/1965 | Krieger | 340—172.5 |

OTHER REFERENCES

IBM Technical Disclosure Bulletin, vol. 6, No. 1, June 1963, pages 82–84, Data Flow Control System, by R. M. Meade and A. E. Fitch.

PAUL J. HENON, *Primary Examiner.*

GARETH D. SHAW, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,400,379 September 3, 1968

Michael Godfrey Harman

It is certified that error appears in the above identified patent and that said Letters Patent are hereby corrected as shown below:

Column 4, line 26, cancel "TRUE= +6v." and insert the same after "follows:" in line 33, same column 4. Column 6, line 42, "$_0m'$," should read -- $_0m_1$, --; line 51, after "true" insert -- if $X_2'$ is true --. Column 9, line 21, "appratus" should read -- appearance --. Column 10, line 13, "gats" should read -- gates --; line 24, "las" should read -- last --.

Signed and sealed this 24th day of February 1970.

(SEAL)
Attest:

Edward M. Fletcher, Jr.
Attesting Officer

WILLIAM E. SCHUYLER, JR.
Commissioner of Patents